US012620074B2

(12) United States Patent
Blake et al.

(10) Patent No.: US 12,620,074 B2
(45) Date of Patent: May 5, 2026

(54) SYSTEMS, APPARATUS AND METHODS FOR REMOTE VISUAL INSPECTION

(71) Applicant: IMRANDD Ltd., Banchory (GB)

(72) Inventors: Christopher Blake, Banchory (GB); Innes Auchterlonie, Banchory (GB)

(73) Assignee: IMRANDD Ltd., Glasgow (GB)

( * ) Notice: Subject to any disclaimer, the term of this patent is extended or adjusted under 35 U.S.C. 154(b) by 0 days.

(21) Appl. No.: 18/823,085

(22) Filed: Sep. 3, 2024

(65) Prior Publication Data

US 2025/0078241 A1 Mar. 6, 2025

(30) Foreign Application Priority Data

Sep. 4, 2023 (GB) ...................................... 2313489

(51) Int. Cl.
*G06T 7/00* (2017.01)
*G01M 5/00* (2006.01)
(Continued)

(52) U.S. Cl.
CPC ......... G06T 7/0002 (2013.01); G01M 5/0075 (2013.01); G01M 5/0091 (2013.01); (Continued)

(58) Field of Classification Search
CPC ...... H04N 7/181; H04N 23/90; G06T 7/0002; G06T 2207/20212; G06T 2207/30184; G01M 5/0075; G01M 5/0091
(Continued)

(56) References Cited

U.S. PATENT DOCUMENTS

| | | | | |
|---|---|---|---|---|
| 7,602,959 B2 * | 10/2009 | Song | .................... | G01N 21/956 |
| | | | | 382/148 |
| 10,825,097 B1 * | 11/2020 | Knuffman | .............. | G06Q 40/08 |

(Continued)

FOREIGN PATENT DOCUMENTS

| | | |
|---|---|---|
| WO | 2014142900 A1 | 9/2014 |
| WO | 2020152866 A1 | 7/2020 |
| WO | 2022122110 A1 | 6/2022 |

OTHER PUBLICATIONS

UK IPO, Combined Search and Examination Report Under Section 17 and 18(3), Application No. GB2313489.3 Imrandd Ltd, Mail date Feb. 16, 2024, 6 pgs.

(Continued)

*Primary Examiner* — Trang U Tran
(74) *Attorney, Agent, or Firm* — Patent Law Works LLP

(57) ABSTRACT

Apparatus and method for visual inspection of a target structure. The apparatus comprises a plurality of cameras for capturing imaging data, the imaging data comprising a plurality of images of the target structure, wherein a first camera of the plurality of cameras is configured to collect the imaging data in a first wavelength range and a second camera configured to collect the imaging data in a second wavelength range, the second wavelength range being a different range of wavelengths to the first wavelength range. At least two of the cameras of the plurality of cameras collect imaging data of the target structure from different angles. The apparatus further comprises a processing unit configured to process the imaging data.

16 Claims, 4 Drawing Sheets

(51) Int. Cl.
*H04N 7/18* (2006.01)
*H04N 23/90* (2023.01)

(52) U.S. Cl.
CPC ... *H04N 7/181* (2013.01); *G06T 2207/20212*
(2013.01); *G06T 2207/30184* (2013.01); *H04N*
*23/90* (2023.01)

(58) Field of Classification Search
USPC ........................................................ 348/125
See application file for complete search history.

(56) References Cited

U.S. PATENT DOCUMENTS

| | | | |
|---|---|---|---|
| 2014/0313345 A1* | 10/2014 | Conard .................. | G06V 20/10 |
| | | | 348/169 |
| 2016/0284075 A1 | 9/2016 | Phan et al. | |
| 2022/0245891 A1 | 8/2022 | Summers | |
| 2022/0358638 A1 | 11/2022 | Ojima et al. | |

OTHER PUBLICATIONS

Combined Search and Examination Report issued for GB 2313489.
3, dated Feb. 16, 2024, 6 pgs.

\* cited by examiner 104
106
102(b)
102(a)
108
102(d)
102(c)
100
118
112
110
112
114
116

(a)                    (b)                    (c)

SYSTEMS, APPARATUS AND METHODS FOR REMOTE VISUAL INSPECTION

CROSS REFERENCE TO RELATED APPLICATIONS

The present application claims the benefit under 35 U.S.C. 119(a) of United Kingdom Patent Application No. 2313489.3, filed Sep. 4, 2023, titled "Systems, Apparatus and Methods for Remote Visual Inspection," the entirety of which is hereby incorporated by reference.

FIELD

This disclosure relates to systems, apparatus and methods of data capture for visual inspection of target structures. Specifically, it describes using multiple cameras that capture image data of the target structure using different wavelength ranges and/or viewing angles for remote visual inspection.

BACKGROUND

Across a typical piece of large infrastructure such as a wind farm, offshore oil/gas asset, or utilities plant, there are many hundreds of locations that require, sometimes by law, to be inspected for safety and maintenance purposes. These inspections may include a visual inspection to be carried out to determine whether the integrity and safety of the equipment/infrastructure remains sound. These inspections are an ideal candidate for permanently stationed inspection equipment but are in practice almost always performed by a human inspector using a camera, information capturing form (such as for example an inspection report), and/or a laser scan. Such an inspection provides a snapshot in time, and does not provide frequent or real-time data.

Historically, the inferior inspection results produced by remote inspection cameras compared to in-person visual inspection has been a barrier for using remote inspection cameras. While more expensive camera systems could be used to increase the quality of the remotely obtained visual data, such a remotely operable camera system is also expensive to implement and expensive to replace. This is particularly relevant to remote monitoring, where cameras can be more exposed to harsher environmental conditions and/or more susceptible to tampering, damage or theft. A remote camera system must be networked (e.g. with wired and/or wireless connections) which may make them difficult to implement on remote assets such as offshore infrastructure. These remote inspection locations often benefit the most from remote inspection. The inspection system would also need to be connected to a power source and/or generate power to function over a useful timespan. Increasing the complexity of the inspection system may provide improved inspection results but have worse battery life.

As such, there is a need for rapid and cost-effective solutions to capture real-time (or close to real-time) visual inspection data. Such a remote visual inspection system may enable improved evaluation of threat levels associated with an asset, and may lead to improved asset degradation/maintenance management.

Proposed herein are systems, methods and apparatus for visual inspection of infrastructure that address at least some of these challenges.

SUMMARY

According to a first aspect of the current disclosure there is provided an apparatus for visual inspection of a target structure. The apparatus comprises a plurality of cameras for capturing imaging data. The imaging data comprises a plurality of images of the target structure. A first camera of the plurality of cameras is configured to collect the imaging data in a first wavelength range and a second camera is configured to collect the imaging data in a second wavelength range. The second wavelength range is a different range of wavelengths to the first wavelength range. At least two of the cameras of the plurality of cameras collect imaging data of the target structure from different angles. The apparatus further comprises a processing unit configured to process the imaging data.

Optionally, each of the plurality of cameras may collect the imaging data in a different wavelength band for multispectral imaging.

Optionally, the different wavelength bands may be nonoverlapping.

Optionally, the wavelength range captured by a camera of the plurality of cameras may comprise wavelengths in a range of 280 nm-800 nm, or 300 nm-800 nm, or 280 nm-800 nm.

Optionally, the wavelength range captured by a camera of the plurality of cameras may comprise wavelengths in a range from 800 nm-2000 nm.

Optionally, the visual inspection may be of a predetermined parameter of the target structure. The first wavelength range and the second wavelength range may be selected based on the predetermined parameter of the target structure.

Optionally, a camera may be provided with an optical filter for selecting a wavelength range to be measured.

Optionally, the plurality of cameras may comprise physically distanced cameras comprised within a common housing. At least some of the plurality of images may be configured to be combined for creating depth perception.

Optionally, the apparatus may further comprise a power source, such as a battery.

Optionally, the apparatus may further comprise an attaching assembly configured to securely attach the apparatus such that the position of the apparatus relative to the target structure is constant.

Optionally, the apparatus may further comprise a connectivity module configured to transmit the captured imaging data to a central unit for analysis of the imaging data for performing the visual inspection.

Optionally, the connectivity module may comprise a wireless connection to the central unit.

Optionally, the central unit may comprise and/or be configured to connect to a cloud-based processor for processing the imaging data.

Optionally, the visual inspection may further comprise determining damage to the target structure based on the imaging data.

Optionally, the apparatus may be configured to capture imaging data at predetermined time intervals.

According to another aspect of the current disclosure there is provided a system for visual inspection of a target structure. The system comprises one or more apparatus as described above, configured to be securely attached to the target structure. The system further comprises a central unit configured to receive imaging data from the apparatus, and analyse the imaging data to perform the visual inspection of the target structure.

According to another aspect of the current disclosure there is provided a method for visual inspection of a target structure by a visual inspection system comprising an apparatus attached to the target structure and a central unit. The method comprises capturing, by a plurality of cameras of the apparatus, imaging data comprising a plurality of images. A processing unit of the apparatus collect the imaging data. A connectivity module (of at least one of the apparatus) transmits the collected imagining data to the central unit. The central unit receives the collected imaging data, and analyses the collected imaging data to perform visual inspection of the target structure.

Features described herein as optional may be combined unless they are mutually exclusive alternatives.

BRIEF DESCRIPTION OF THE DRAWINGS

Embodiments of the invention will now be described, by way of example only, with reference to the accompanying schematic drawings, in which.

DETAILED DESCRIPTION

Figure 1:
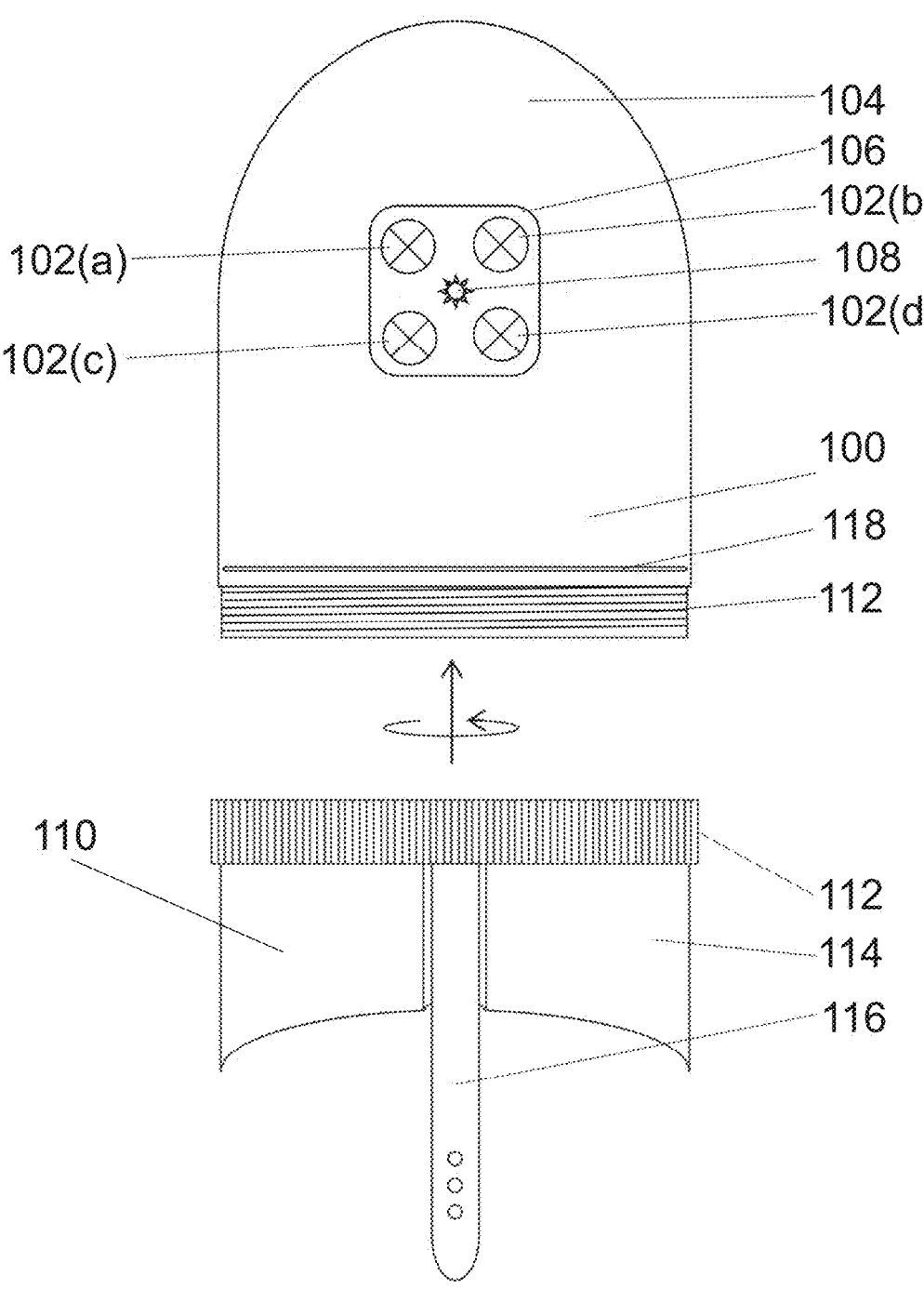
FIG. 1 depicts a schematic representation of an apparatus for visual inspection

Large physical assets such as large infrastructure, e.g. bridges, buildings, oil and gas infrastructure, offshore structures, etc. may degrade, break down, or fail. The operator or owner of these assets has motivation and often legal/safety obligations to maintain the asset in good working order. This may include inspections of the asset to ascertain the condition it is in, and performing necessary maintenance and repairs.

Visual inspections may be performed to observe signs of physical damage or degradation. The inspection may be of particular features of the asset, which may also be referred to as target structures. Examples of target structures include bridge supports on bridges, offshore structure piping, structural bulkheads, wind turbines, oil and gas installations. In some instances target structures may be on onshore, but remote equipment, such as for example piping, pressure vessels, and structural kit (e.g. supports, skids). Sometimes, human inspection may be inconvenient, difficult and/or expensive, for example when the target structure is located in a remote or hard to reach location (e.g. offshore, high above ground, etc). As a result, human inspection may be challenging, high risk, time-intensive, and costly. It is therefore desirable to achieve an automated visual inspection solution not requiring human presence on-site. This may be referred to as a remote solution to perform visual inspection.

In recent years, many types of monitoring have been automated, but visual inspections remain to this point largely not automated. There are several reasons for this, including the level of accuracy needed in a system to match the level of detail observable by an in-person visual inspection. The hardware needed to match in-person inspection is expensive due to the high resolution and multiple viewing angles required. The cost and challenges associated with running and maintaining these hardware systems, often in remote and/or difficult conditions, present further barriers to automation.

Advantages of a remote visual inspection system include reducing the need for physical in-person inspections. This may deliver safer, cheaper, and/or more reliable operations of the inspected asset. It may reduce the carbon footprint of inspection/operation. The transport to remote infrastructure may often be energy-intensive, e.g. involving helicopter flights. It can increase the availability, repeatability and consistency of the inspection data, as remote inspection can enable automatic, real-time recording of inspection data. Furthermore, the images taken at different times may be more comparable, and taken from the same location(s). It may increase automation and reduce the need for physical presence on remote sites.

Described herein are methods, apparatus and systems for remote visual inspection of a target structure. The methods may comprise the collection of image data in a visual inspection methodology. The solution described herein may use an apparatus comprising readily available components including multiple cameras to capture different types of image data. The method then uses image data analysis to combine ("fuse") the different types of image data captured by the apparatus. This may deliver a set of images that provide more information than can be observed by the human eye. This presents a paradigm shift away from current best practice, in which remote visual inspection is limited by the difficulty and costs to enact and maintain the inspection. The choice of readily available components contributes to keeping costs down.

FIG. 1 depicts an apparatus 100 for visual inspection of a target structure, for example on an infrastructure asset. The apparatus 100 comprises a plurality of cameras 102(*a*), 102(*b*), 102(*c*), 102(*d*) for capturing imaging data. The imaging data collected by the apparatus comprises a plurality of images of the target structure. The plurality of cameras comprises a first camera 102(*a*) configured to collect the imaging data in a first wavelength range. The plurality of cameras comprises a second camera 102(*b*) configured to collect imaging data in a second wavelength range. The second wavelength range is a different range of wavelengths to the first wavelength range. At least two of the plurality of cameras 102(*a*)-(*d*) collect imaging data of the target structure from different angles. The apparatus further comprises a processing unit (not depicted) configured to process the imaging data.

An advantage of the apparatus as described above is that the imaging data from the plurality of cameras can be used for visual inspection with improved quality compared to visual inspection from a single camera. The image data may be formed from a plurality of images captured by the plurality of cameras. Different images may be captured in a different wavelength range, such that different details of the target structure may be visible in the different images, dependent on the wavelength range collected by the corresponding camera. Furthermore, by capturing different images from different angles, these may be used to obtain three-dimensional information of the target structure, for example stereoscopic images for stereo-photogrammetry. The plurality of cameras may be configured to capture images of the target structure for the same moment or moments in time. The second camera may be configured to capture images of the target structure having a different range of wavelengths to the images of the target structure captured by the first camera for the same moment or moments in time, i.e. the images captured by the first and second cameras may be for the same time, but with different wavelength ranges. Similarly, the at least two of the plurality of cameras may be configured to collect imaging data of the target structure for the same moment or moments in time from different angles. As such for a given moment or moments in time, the apparatus may collect images with different wavelength ranges and/or from different angles. This may facilitate additional analysis and allows a time series profile of the target structure to be constructed.

The apparatus 100 comprises a common housing 104 that houses the components of the apparatus 100. The plurality of cameras 102(a)-(d) may be contained within a camera module 106. In some examples, the camera module 106 is interchangeable for easy replacement. The camera module may in some instances comprise a light source 108, such as for example an LED for illuminating the target structure when imaging data is collected. The light source 108 may comprise a white light source and/or one or more coloured light sources. The apparatus may have a removable base 110. The removable base 110 may be removably attached to the part of the apparatus comprising the camera module 106 for example using a screw-fit mechanism 112. However, other mechanisms for attaching the removable base could be used, such as clips, bolts, interference fit, and/or the like, depending on the particular application. The system for removing/ attaching the base 110 to the rest of the apparatus 100 may for example comprises a gasket seal 118 for sealing the base to the apparatus such that the inside of the apparatus is protected from the outside environment. The apparatus 100 may comprise an attaching assembly 114. The attaching assembly may be part of the removable base. The attaching assembly may for example comprise a made-to-size pipe saddle attachment such that the base can fit neatly onto the correct size pipe. The attaching assembly may comprise for example an attachment strap 116.

In other examples, different forms of removable base 110 for attaching to different structures could be used. For example, although the saddle and strap 116 base 110 is shown and described, the removable base could take other forms such as a planar base or other shaped based that corresponds with a shape of the structure to which the apparatus 100 is to be mounted. Furthermore, although a strap 116 is used in the example shown to attach the apparatus 100 to the structure, particularly to pipes, other fixings for attaching the base 110 and thereby the apparatus 100 could be used, for example, the base 110 could be provided with screw or bolt holes, screw or bolt fixtures, adhesive areas, one or more magnetic couplings, one or more hooks or eyelets, jubilee clips, members for interlocking with corresponding members on the structure, and/or the like. As noted below, the removable bases 110 can be interchangeable, so that a particular base 110 best suited for mounting to a particular structure can be selected and fitted to the common housing 104/rest of the apparatus 100, that can be used with any of the different interchangeable bases 110.

The processing unit may comprise one or more (hardware) processors and a non-transitory storage medium (memory) for receiving the data and storing any processing results. The processing of the image data may be for performing the visual inspection. The processing of the imaging data by the processing unit of the apparatus may form a portion of the processing performed for the visual inspection. Another portion of the processing for visual inspection may be performed at a central unit comprising one or more further processors and memory. The processing unit provided at the apparatus may perform a small amount of the total processing performed on the imaging data. The majority of the processing of the imaging data may be performed at a central unit. This processing at the apparatus may for example include: collecting imaging data from the plurality of cameras, applying of one or more electronic filters to the imaging data, uploading of imaging data files (in raw format).

The plurality of cameras may comprise two or more cameras, for example two, four, six, or eight cameras, or another number of cameras. The plurality of cameras may be arranged in an array, for example in rows and/or columns across the apparatus, or two or more cameras may be obliquely oriented with respect to each other, such that they may observe the target structure from different angles. The arrangement of cameras on the apparatus may be a set arrangement, or may be custom selected based on the specific target structure to be visually inspected. The arrangement may depend on the number of cameras available on the apparatus.

Each of the plurality of cameras may collect imaging data in a different range of wavelengths. The range of wavelengths collected by a camera may be a band of wavelengths, wherein a band is a continuous range of wavelengths. The wavelength ranges collected by the different cameras may be non-overlapping. In some instances, the wavelength ranges collected by at least some of the cameras may partially but not fully overlap. In some instances two or more of the plurality of cameras may collect the same wavelength range. Any combination of identical, partially overlapping, and/or non-overlapping cameras may be included in the plurality of cameras.

At least one of the cameras may collect imaging data in a wavelength range in the visible spectrum (e.g. 380 nm-800 nm). In some instances, the wavelength ranges may be broader than the visible spectrum (e.g. also covering a portion of the ultraviolet spectrum), such as 300 nm-800 nm, or 280 nm to 800 nm. The wavelength range collected by a camera may be narrower than the full visible spectrum. The camera collecting imaging data in the visible spectrum may be an RBG camera capable of capturing radiation over (almost) the full visible spectrum with an optical filter that limits the collected wavelength range. Other parts of the spectrum (e.g. yellow, orange, violet) may be captured by cameras with optical filters corresponding to the collected wavelength range. The optical filter may be a bandpass filter which transmits radiation within a range and reject (e.g. absorb, reflect) wavelengths outside the bandpass range. The bandpass transmitted range may for example have a width from 50 nm-100 nm.

At least one of the cameras may collect imaging data in a wavelength range in the infrared part of the spectrum (e.g. 800 nm-2000 nm). The infrared imaging may comprise thermal imaging. The camera may be an infrared camera with an infrared filter for selecting a specific wavelength range to be collected by the camera. In some instances no filter is provided to the infrared camera. The infrared range collected by the camera may be wider than the wavelength range(s) collected by the visible camera(s) of the plurality of cameras. In an example implementation, the plurality of cameras comprises four cameras, including three cameras collecting visible radiation, with one camera collecting radiation in the red part of the spectrum, one camera collecting radiation in the green part of the spectrum, and one camera collecting radiation in the blue part of the spectrum, and one camera collecting infrared radiation.

As described above, the apparatus may collect images in different wavelength ranges. In examples, hyperspectral cameras can be used for remote visual inspection. Hyperspectral cameras are cameras which can capture image data within multiple specific wavelength ranges across the electromagnetic spectrum. They can measure light from hundreds of different spectral bands, which can range far beyond the visible spectrum (for humans). While the exact boundaries of the visible spectrum can vary in different definitions, it may generally be considered to range from 380 nm to 780 nm. Electromagnetic radiation outside of the visible range is invisible to human eye but can still be captured by cameras and used for imaging.

An advantage of hyperspectral cameras is that they can detect foreign objects like dirt, debris, etc. which may be hard to detect with conventional RGB cameras. Typical RGB cameras primarily transduce detecting light from the visible spectrum into three overlapping components: red (R), green (G), and blue (B), to correspond with colour detection in the human eye. By contrast, hyperspectral cameras can detect electromagnetic radiation and break it down into more and/or narrower wavelength bands. This may increase the level of observed detail in the wavelength distribution of the captured light. It may also expand the captured light beyond the wavelengths visible to the human eye. This may for example include infrared (wavelengths longer than long-wavelength end of the visible spectrum, e.g. >780 nm) and ultraviolet (wavelengths shorter than the short-wavelength end of the visible spectrum, e.g. <380 nm). While they do not correspond to colours as observer by human perception, a wavelength distribution in image data may still be referred to as colour data.

While hyperspectral imaging can be useful for detailed sensing applications, it may be a costly technology to implement at scale. Presented herein is a more cost-effective alternative to hyperspectral imaging, referred to as multi-spectral imaging. While hyperspectral imaging uses specialised components with high wavelength resolution over a wide wavelength range, multispectral imaging can use off-the-shelf equipment such as standard cameras in combination with wavelength filters (which may be cheaper and easier to obtain). Multispectral imaging may achieve the same advantages as hyperspectral imaging, such as being able to detect dirt, corrosion, debris, etc. This may especially be the case when the wavelengths collected by the cameras are tuned in relation to the objects to be detected. The wavelengths may have been determined for example experimentally on test target structure, and/or based on calculations or simulations.

The apparatus, methods, and systems described herein can implement multispectral imaging by combining set ranges of wavelengths. Multispectral imaging may be achieved by using a plurality of cameras for example as described in relation to FIG. 1. Multispectral imaging may achieve the same advantages as hyperspectral imaging, such as being able to detect dirt, corrosion, debris, and other physical issues/impairments. While the spectral resolution of multispectral cameras may be lower compared to hyperspectral cameras, the results may still be sufficient to achieve high quality visual inspection. Advantageously, multispectral imaging may also be easier and cheaper to implement compared to hyperspectral imaging.

In some implementations, the visual inspection of a target structure may be of one or more predetermined parameters or features (e.g. inspecting for the presence of corrosion, dirt, cracks, etc.). The wavelengths ranges collected by the plurality of cameras may be tuned/selected based on the specific nature of the predetermined parameter(s)/feature(s). The wavelength range(s) that are best suited to detect a particular parameter or feature may have been determined for example experimentally on test target structure, and/or based on calculations or simulations. The wavelength ranges may be bands of wavelengths. The ranges may fall in the red, green, blue, and/or infrared parts of the spectra, for example in a range from 380 nm to 2000 nm. In particular, one or more wavelength ranges of interest may be determined for a target structure. For example wavelengths in the red spectral range (e.g. one or more wavelengths in the range of 600 nm-700 nm) may be of interest. Infrared wavelengths (e.g. one or more wavelengths≥800 nm) may be of interest.

Figure 2:
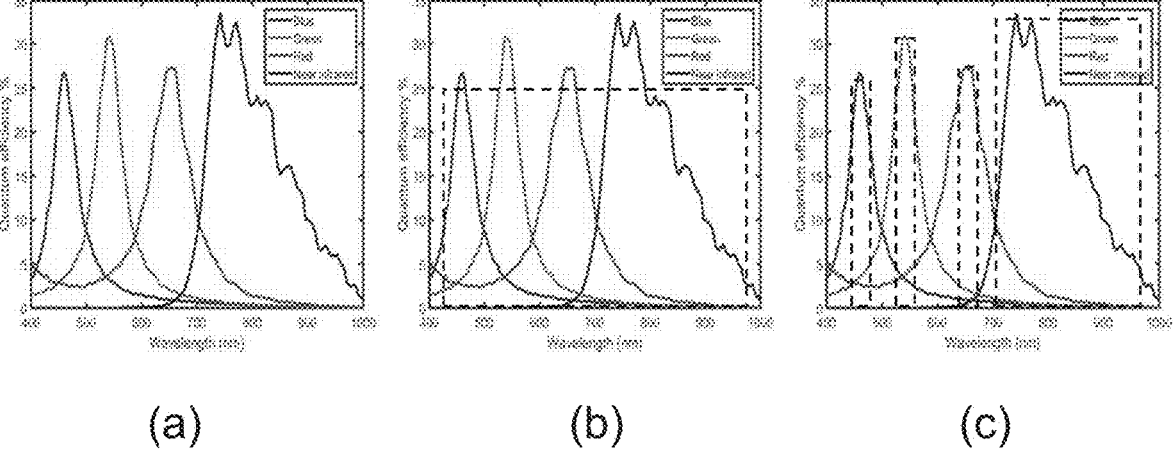
FIG. 2 depicts schematic graphs of wavelengths detected by (a) conventional cameras, (b) a hyperspectral camera, and (c) a multispectral camera.

FIG. 2 depicts example graphs of wavelengths detected by conventional RGB cameras, and by a multispectral camera, wherein the wavelength is set out on the x-axis (horizontal) and the measurement sensitivity is set out on the y-axis (vertical). The measurement sensitivity may be expressed as quantum efficiency %. FIG. 2(a) depicts the range of wavelengths available to regular commercially available RGB cameras (the three peaks at the lower wavelength end of the scale), and an example of wavelengths available to be measures by an infrared camera (the peak at the right hand side of the scale), which may also be commercially available. FIG. 2(b) depicts how a hyperspectral camera would capture all wavelengths available over a wavelength range (indicated in dashed lines). FIG. 2(c) depicts an example of wavelength ranges available to standard/commercially available RGB and infrared cameras as shown in FIG. 2(a), with wavelength bands selected for multispectral imaging shown in dashed lines.

Next to multispectral imaging using imaging data captured in multiple different wavelength ranges, the plurality of cameras may also capture imaging data from a plurality of different angles. In order to achieve this, the cameras may be physically distanced, and optionally oriented differently to each other, while comprised within a common housing. The plurality of cameras may each capture an image simultaneously. The images may comprise stereoscopic images for stereo-photogrammetry. The common housing may have components for easy maintenance and easy access, such as screw-fit components.

The common housing may include an attaching assembly for securing the apparatus to/at the asset. The attaching assembly may securely attach the apparatus to/at the asset such that the position of the apparatus relative to the target structure allows the cameras can obtain the imaging data. The apparatus may be set up relative to the target structure at a set and predetermined position. The position may be determined based on the desired visual inspection to be performed. Other considerations may include ease of access, lighting conditions, protection from the surrounding environment, etc. As the position may be constant, images obtained at different times may be compared.

The position of the apparatus relative to the target structure may be constant. An advantage of this constant position may be that collected image data may be analysed/compared over time, as part of the visual inspection, for example for observing changes, predicting future changes based on historic data etc. A predetermined location may have been determined for positioning the apparatus for capturing imaging data of the target structure. The attaching assembly may be custom designed to be suitable for attaching to this predetermined location. For example, the attaching assembly could include at least one strap, jubilee clip, band, screw hole, adhesive fixer, hook, loop, and/or the like, and other mechanisms for fixing dependant on the application and location could be used.

The common housing may have a battery housing for installing a battery. The battery may be a standard, commercially available battery, and may be located in an easily accessed location, for example for ease of replacement. The battery may be a power source for providing power to the apparatus. In some instances a power source other than a battery may be provided to the apparatus additionally or alternatively to a battery. The power source may for example comprise a connection to a power source that is external to the apparatus (e.g. an external battery, generator, mains power, solar panel system, etc).

The common housing may have been designed for production scalability, ease of access, ease of maintenance, cost, ability to withstand the conditions at the target structure. For example, the common housing may be water resistant to an IP rating of IP63, IP65, IP67 or greater. For example, the common housing may have gasket seals compliant to IP and EX standards. The common housing may comprise a simple screw fit mechanism. The screw down mechanism may be coupled with ABS construction, which may contribute to longevity and ease of access when required. The common housing may consist of one main housing that is accessible via the (screw-fit) base of the housing. The access via the (screw-fit) base may provide access to the pairing info to the apparatus, access to the camera modules, and/or access to the batteries. Different base types may be provided, depending on the type of attachment required for attaching to a specific target structure (e.g. piping, bulkhead, etc.) The attaching assembly may be provided on the base. The different types of base may be interchangeable (e.g. by all using the same screw-down mechanism to the apparatus). This way, the required type of base may be selected and installed on an apparatus for installing to a specific target structure. This may lead to good scalability, as each apparatus may be compatible with each type of target structure, simply be changing out the base.

The apparatus may further comprise a connectivity module. The connectivity module may be located inside the housing. The connectivity module may be connected to the processing unit. The connectivity module may be configured to connect to other entities external to the apparatus. The connectivity module may be connected to a central unit comprising a central processing unit for performing processing of the imaging data. In some implementations, the connectivity module may be implemented as a separate module in the apparatus. Additionally or alternatively, a connectivity implementation may be integrated in one or more of the cameras.

The apparatus may form part of a system for visual inspection of the target structure. The system may comprise one or more apparatus for capturing imaging data of the target structure for visual inspection, as well as a central unit for performing analysis of the imaging data for performing visual inspection. The imaging data may be sent by the apparatus to the central unit via a connectivity module, for example via a wireless connection. The central unit may in some instances be connected to and/or located in the cloud. Some or all of the analysis may be performed by processors in the cloud. Some or all of the processing may be performed by one or more processor(s) located at the central unit. That is, some or all of the image processing and/or inspection processing may be performed locally on board the apparatus for visual inspection, at the central unit and/or remotely in the cloud, or distributed between any combinations thereof.

The apparatus may be configured to collect/capture image data at predetermined time intervals. The time intervals may be regular time intervals. In some implementations, the apparatus may be configured to perform automated measurements, with measurement of imaging data taken at automated times/time intervals. Additionally or alternatively, the apparatus may be configured to collect/capture imaging data in response to receiving an instruction to capture and transmit imaging data. The time intervals may be adjusted based on analysis of previously captured imaging data. The instructions may be received based on analysis of previously captured imaging data. The time intervals could be, for example, common time intervals used for all of the cameras so that they capture images at the same times.

The imaging data may comprise a plurality of images, wherein each image may be collected by a different camera of the plurality of cameras. Two or more of these images may be combined to form a combined images. For example, different images collected by different cameras for the same time may be combined to form combined images of the target structure for that time. In some implementations, images captured by each of the plurality of cameras may be processed and combined to form a combined image. The processing may be performed by the processing unit of the apparatus and/or by a central processing unit that is remote to the apparatus. The combined image may be formed in part or fully by a central unit connected to the apparatus.

The imaging data may be analysed in order to perform the visual inspection. As part of the analysis of the imaging data, one or more determinations may be made of the target structure based on the imaging data. The determinations may for example include determining damage, corrosion, the presence of dirt, etc. to the target structure. The visual inspection may be for monitoring at least one predetermined asset condition of the target structure. A predetermined asset condition may for example be a physical change, degradation of the target structure, obstruction, or security threat.

In some instances a determination may be based on imaging data over time. The determination may be based on a changes to the target structure over time. This may include determining damage/corrosion/dirt based on observed changes. The determination may be used to extrapolate/ predict future changes. Based on the predictions, the determination may for example include predicting when future maintenance should occur. The determination can be used to schedule and carry out maintenance before damage/corrosion/dirt build-up etc. occurs. Predictive maintenance, in which a structure is inspected at multiple points in time to identify patterns or trends, may be performed in order to predict when the structure may fail. Predictive maintenance may then aim to schedule maintenance at a point in time before the failure occurs.

Analysis of the imaging data may involve image processing to process the data for image analysis. The analysis may be performed by software, by a human, or a combination of both. The image analysis may be used to observe the physical state of the target structure, observe damage, and/or track changes over time. The analysis may be used to predict/schedule maintenance. The analysis may be used as a trigger to replace or repair a component, to perform service of the target structure, or to perform another action in relation to the target structure. The analysis may be performed at the central unit. In some instances, the analysis may include analysis by a machine learning algorithm (e.g. classification of the imaging data to determine damage/ corrosion etc). The analysis may be performed by or checked by a human, for example the imaging data may be processed for human inspection (so that it is interpretable by the human eye), and a human inspector may use the imaging data for making a determination. In some implementations, the analysis may include a human analysing image data to check/confirm a determination made by a software processing unit of the system.

In some implementations, the image processing may include using images captured from different angles to generate three-dimensional information comprised in the imaging data. The three-dimensional data may for example include stereoscopic imaging. This may include generating one or more stereoscopic imaging based on the two or more images taken of the target structure from different angles. Preferably, the images used for generating the three-dimensional data may have been obtained substantially at the same time.

In some implementations, the image processing may include capping a spectrum of the collected imaging data and generating an image with the limited wavelengths included in the capped spectrum. The capped spectral image may be used to highlight one or more features of the target spectrum. For example some wavelengths may highlight debris, corrosion, etc. In some examples, wavelengths in the red and/or infrared parts of the spectrum may be of interest. In an example implementation, a (replica) target structure may be tested (e.g. adding dirt, debris, corrosion, damage) with a hyperspectral camera, and the wavelengths that provide the best imaging of the issues may be selected to be included in the multispectral camera. In another example, coloured LEDs may be used to highlight one or more particular features of an apparatus.

The apparatus may have a first operation mode and a second operation mode, wherein the first operation mode is a low power mode (or power save mode) in which the power source limits power supply to maintain minimal functionality of the apparatus. The minimal functionality may enable the apparatus to remain connected (e.g. by providing power to the connectivity module). For example, the minimal functionality may be a sleep mode in which the apparatus is able to receive and/or trigger wake signals for starting up more functionality of the apparatus. In the low power mode, no imaging data is obtained, the processing unit does not process imaging data, and/or a connectivity module does not send any imaging data. The second operating mode may be an operation mode for obtaining and transmitting imaging data and/or any data derived therefrom. In the operation mode, the apparatus may be provided with power for its full functionality as required. This may include collecting imaging data, processing imaging data, transmitting imaging data to a central unit, etc.

Next to a plurality of cameras, the apparatus may comprise one or more other sensors, for example lasers, temperature sensors, pressure sensors, etc. The data collected by these sensors may be used alongside the imaging data, for example for providing context to the imaging data. When describing the transmitting of imaging data in this application, data collected by other sensors present in the application may be included as well (despite not being imaging data) and/or or data derived from the imaging data could also be included.

Some assets may have a plurality of apparatuses (i.e. a plurality of the apparatuses for visual inspection of the target structure) attached to them for monitoring target structures. The apparatuses may form a network or sequence, in which the plurality of apparatuses across a system coordinate and communicate with each other and/or with a central unit. In some instances they can send image data captured to each other. In some instances, instead of each apparatus sending image data to a central unit, the apparatuses can send image data to neighbouring apparatuses, forming for example a network or chain of apparatuses. One (or more) apparatus(es) may be designated the main apparatus(es), which may collect and group image data from the other apparatuses and send the grouped image data to the central unit. In some instances the main apparatus of the plurality may be selected because it is the nearest apparatus to the central unit. In other implementations, the main apparatus may be selected for a different reason, for example because it is connected to a larger power source, or has additional or available processing capability, etc.

Figure 3:
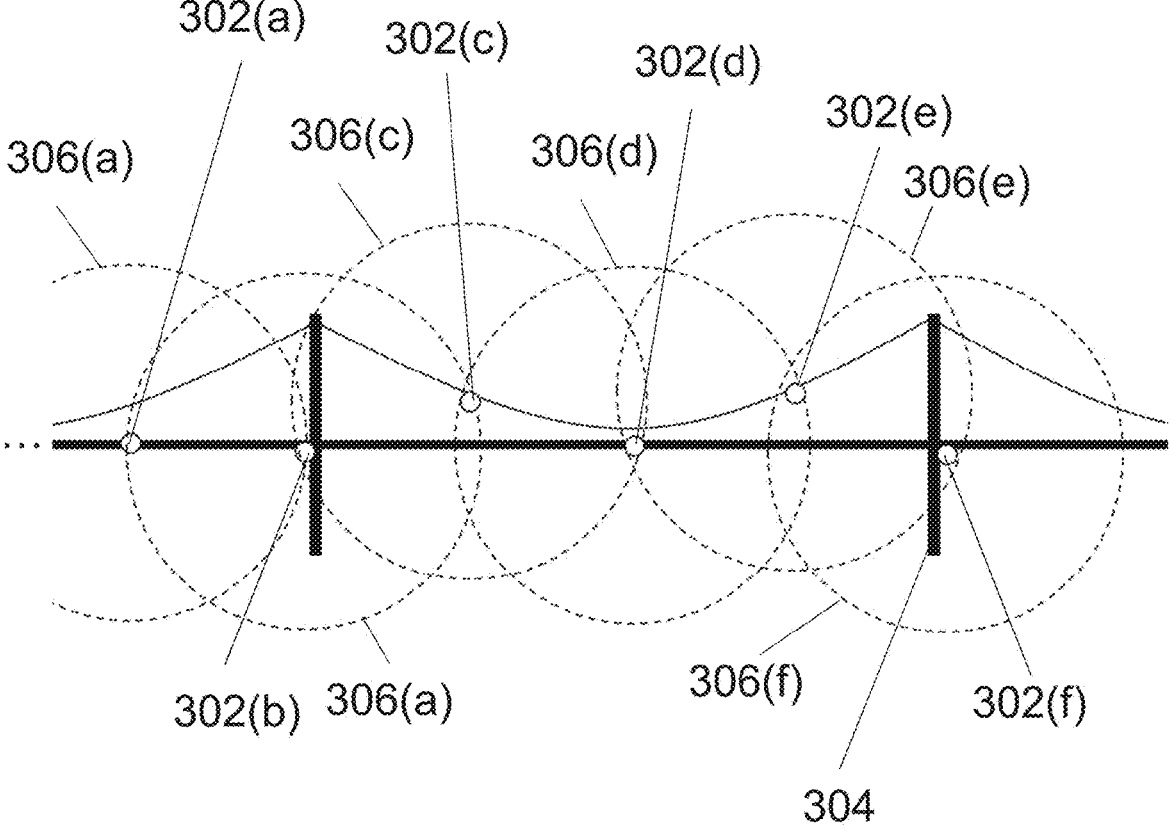
FIG. 3 depicts a schematic representation of an asset on which a plurality of apparatus for visual inspection are attached.

FIG. 3 depicts an example representation of a plurality of apparatuses 302(a)-(f) monitoring an asset 304. Specifically the figure shows the asset 304 in the form of a bridge with the plurality of apparatuses installed along the length of the bridge. An apparatus may have a connectivity module with a first communication method. The first communication method may be a wireless communication method with a communication range 306(a)-(f). For example, the first communication method may be or comprise communication protocols such as Bluetooth (e.g. Bluetooth 4.0), Bluetooth Low Energy (BLE), Wi-Fi (e.g. WiFi 6E) or the like. The communication protocols may be used with standards such as for example Zigbee, Z-wave, Sidewalk, etc. In the example shown, the plurality of apparatuses may be located within a communication range of at least one other apparatus. This may enable the different apparatuses to communicate with each other using the first communication method. An apparatus may use the first communication method to communicate with any other apparatus that is within its range.

Some or all of the apparatuses may be able to communicate using a second communication method (e.g. WLAN, 3G, LTE, 5G, LoRa or the like). The second communication method may be a wireless communication method. The second communication method may have a longer range than the first communication method. An apparatus may use the second communication method to communicate directly with a central unit, for example to transmit imaging data directly to a central unit and/or to receive instructions from a central unit. An advantage of the first communication method may be that it requires less power, and therefore may enable a longer battery life for the apparatus. An advantage of the second communication method may be the increased range and ability to communicate with a larger group of apparatus, central unit(s), and/or other device(s) configured to communicate with the apparatus.

In a specific example, a plurality of apparatus are located on an asset such as the bridge depicted in FIG. 3. Each of the apparatus may collect imaging data and send it to a neighbouring apparatus along the length of the bridge. The apparatuses may form a chain of apparatuses along the length of the bridge to an endpoint apparatus located at/near at least one end of the bridge. The apparatuses may pass their own imaging data, as well as received imaging data, to neighbouring apparatuses along the chain of apparatuses formed along the bridge. The endpoint apparatus may collect the imaging data from the plurality of apparatuses and group it together. For example, the endpoint apparatus may collect imaging data from different apparatuses collected at a particular time or during a particular time period. The endpoint apparatus may transmit the collected imaging data from the plurality of apparatuses to the central unit. Communication between apparatuses may be performed via the first communication method. Communication between an endpoint apparatus and a central unit may be via the second communication method. This may mean lower power consumption at the apparatuses other than the endpoint apparatus, compared to a system in which each apparatus communicates with the central unit directly. An endpoint apparatus may be provided with a larger power source than other apparatuses to accommodate its increased power use, or may be located in an easier to reach location such that replacement of batteries is easier/more convenient.

Figure 4:
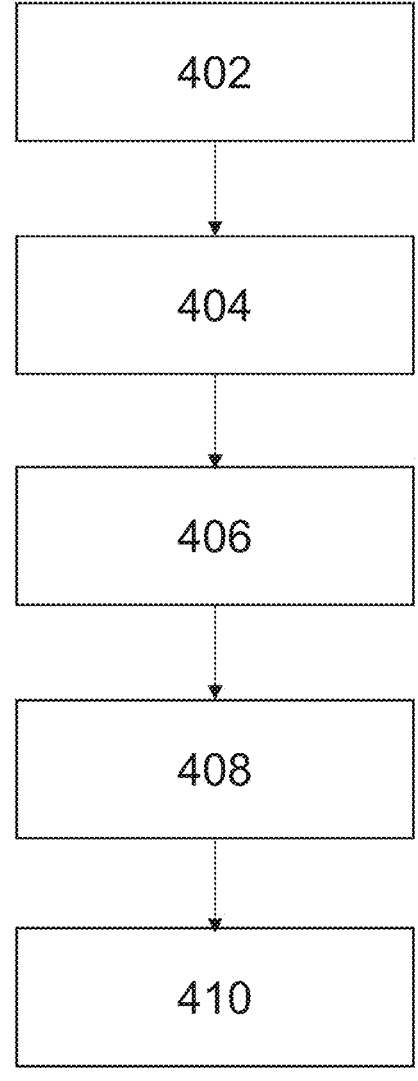
FIG. 4 depicts a flow diagram of a method for visual inspection of a target structure.

FIG. 4 depicts a flow diagram of steps in a method 400 for visual inspection of a target structure using an apparatus and system as described above. The apparatus is configured to be attached to an asset comprising the target structure. The apparatus is configured to be connected to a central unit as described in more detail above. In step 402, a plurality of cameras of the apparatus capture imaging data comprising a plurality of images. A processing unit of the apparatus collects 404 the imaging data. A connectivity module transmits 406 the collected imagining data to the central unit. The central unit receives 408 the collected imaging data. The central unit analyses 410 the collected imaging data to perform visual inspection of the target structure.

While described herein in relation to a large infrastructure asset, the methods and apparatus for visual inspection of a target structure may be used in relation to other assets as well, regardless of their size, location, or purpose.

The invention claimed is:

1. An apparatus for visual inspection of a target structure, the apparatus comprising:
  a plurality of cameras for capturing imaging data, the imaging data comprising a plurality of images of the target structure, wherein a first camera of the plurality of cameras is configured to collect the imaging data in a first wavelength range and a second camera configured to collect the imaging data in a second wavelength range, the second wavelength range being a different range of wavelengths to the first wavelength range;
    wherein the visual inspection is of a predetermined parameter of the target structure, and
    wherein the first wavelength range and the second wavelength range are selected based on the predetermined parameter of the target structure; and
    wherein at least two of the cameras of the plurality of cameras collect imaging data of the target structure from different angles; and
  a processing unit configured to process the imaging data.

2. An apparatus according to claim 1, wherein each of the plurality of cameras collects the imaging data in a different wavelength band for multispectral imaging.

3. An apparatus according to claim 2, wherein the different wavelength bands are non-overlapping.

4. An apparatus according to claim 1, wherein the wavelength range captured by a camera of the plurality of cameras comprises wavelengths in a range of 280 nm-800 nm.

5. An apparatus according to claim 1, wherein the wavelength range captured by a camera of the plurality of cameras comprises wavelengths in a range from 800 nm-2000 nm.

6. An apparatus according to claim 1, wherein a camera is provided with an optical filter for selecting a wavelength range to be measured based on the predetermined parameter of the target structure.

7. An apparatus according to claim 1, wherein the plurality of cameras comprise physically distanced cameras comprised within a common housing, and wherein the at least some of the plurality of images are configured to be combined for creating depth perception.

8. An apparatus according to claim 1, further comprising a power source.

9. An apparatus according to claim 1, wherein the apparatus further comprises an attaching assembly configured to securely attach the apparatus such that a position of the apparatus relative to the target structure is constant.

10. An apparatus according to claim 1, further comprising a connectivity module configured to transmit the captured imaging data to a central unit for analysis of the imaging data for performing the visual inspection.

11. An apparatus according to claim 10, wherein the connectivity module comprises a wireless connection to the central unit.

12. An apparatus according to claim 1, wherein a central unit comprises a cloud-based processor for processing the imaging data.

13. An apparatus according to claim 1, further comprising, determining damage to the target structure based on the imaging data.

14. An apparatus according to claim 1, wherein the apparatus is configured to capture imaging data at predetermined time intervals.

15. A system for visual inspection of a target structure, comprising:
  one or more apparatus configured to be securely attached to the target structure,
    wherein a first apparatus includes a plurality of cameras;
    wherein a first camera in the plurality of cameras collect the imaging data in a first wavelength range;
    wherein a second camera configured to collect the imaging data in a second wavelength range;
    wherein the second wavelength range being a different range of wavelengths to the first wavelength range;
    wherein the first wavelength range and the second wavelength range are selected based on a predetermined parameter of the target structure; and
    wherein at least two of the cameras of the plurality of cameras collect imaging data of the target structure from different angles; and
  a central unit configured to receive imaging data from the apparatus, and analyze the imaging data to perform the visual inspection of the target structure.

16. A method for visual inspection of a target structure by a visual inspection system comprising an apparatus attached to the target structure and a central unit, the method comprising:
  capturing, by a plurality of cameras of the apparatus, imaging data comprising a plurality of images of the target structure, wherein:
    a first camera in the plurality of cameras collect the imaging data in a first wavelength range;
    a second camera configured to collect the imaging data in a second wavelength range;
    the second wavelength range being a different range of wavelengths to the first wavelength range;
    the first wavelength range and the second wavelength range are selected based on a predetermined parameter of the target structure; and
    at least two of the cameras of the plurality of cameras collect imaging data of the target structure from different angles;
  collecting, by a processing unit of the apparatus, the imaging data;
  transmitting, by a connectivity module, the collected imagining data to the central unit;
  receiving, by the central unit, the collected imaging data; and
  analyzing, by the central unit, the collected imaging data to perform visual inspection of the target structure, wherein the visual inspection is of the predetermined parameter of the target structure.

* * * * *